United States Patent
Considine, Jr. et al.

(10) Patent No.: US 9,810,206 B2
(45) Date of Patent: Nov. 7, 2017

(54) QUICK CONNECTOR FOR HYDRAULIC HOSE COUPLING

(71) Applicant: Caterpillar Inc., Peoria, IL (US)

(72) Inventors: Patrick E. Considine, Jr., Aurora, IL (US); Carl H. Rempert, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 147 days.

(21) Appl. No.: 14/658,974

(22) Filed: Mar. 16, 2015

(65) Prior Publication Data
US 2016/0273693 A1   Sep. 22, 2016

(51) Int. Cl.
*F16L 37/133* (2006.01)
*F04B 17/05* (2006.01)
*F16L 37/138* (2006.01)

(52) U.S. Cl.
CPC ............ *F04B 17/05* (2013.01); *F16L 37/133* (2013.01); *F16L 37/138* (2013.01)

(58) Field of Classification Search
CPC ..... F16L 19/065; F16L 21/005; F16L 21/002; F16L 21/04; F16L 37/05; F16L 37/0842; F16L 37/088
USPC ........................................ 285/323, 322, 324
See application file for complete search history.

(56) References Cited

U.S. PATENT DOCUMENTS

| | | | | |
|---|---|---|---|---|
| 1,001,069 A | * | 8/1911 | Nielsen | F16L 35/00 285/322 |
| 2,694,584 A | * | 11/1954 | Miller | F16L 33/222 279/56 |
| 2,727,759 A | * | 12/1955 | Elliott | F16L 29/02 285/322 |
| 3,096,999 A | * | 7/1963 | Ahlstone | F16L 37/002 285/322 |
| 3,628,812 A | * | 12/1971 | Larralde | F16L 37/133 285/322 |
| 4,055,359 A | * | 10/1977 | McWethy | F16L 37/22 285/318 |
| 4,120,519 A | * | 10/1978 | Bridges | F42B 15/36 285/322 |
| 4,212,487 A | * | 7/1980 | Jones | F16L 33/225 285/323 |
| 4,500,117 A | * | 2/1985 | Ayers | F16L 37/12 285/323 |
| 4,705,304 A | * | 11/1987 | Matsuda | F16L 25/0036 285/322 |
| 4,790,571 A | * | 12/1988 | Montanari | F16L 37/133 285/322 |
| 4,902,045 A | * | 2/1990 | McGugan | F16L 37/002 285/322 |
| 4,948,176 A | | 8/1990 | Bartholomew | |
| 5,228,729 A | * | 7/1993 | McElroy | F16L 37/0987 285/921 |

(Continued)

FOREIGN PATENT DOCUMENTS

CN   202937913 U   5/2013

*Primary Examiner* — David E Bochna
(74) *Attorney, Agent, or Firm* — Miller, Matthias & Hull LLP

(57) ABSTRACT

A hydraulic fluid line coupling system is disclosed. The coupling may include a female fitting, a male fitting, first and second elastomeric seals between the female fitting and male fitting, and a cylindrical collar surrounding the female fitting, male fitting, and first and second elastomeric seals.

15 Claims, 6 Drawing Sheets

(56) References Cited

U.S. PATENT DOCUMENTS

| | | | | |
|---|---|---|---|---|
| 5,540,463 | A * | 7/1996 | Potokar | F16L 37/08 285/319 |
| 5,575,510 | A * | 11/1996 | Weh | F16L 37/38 285/312 |
| 5,649,723 | A * | 7/1997 | Larsson | F16L 37/1215 285/322 |
| 5,823,702 | A * | 10/1998 | Bynum | F16L 19/005 403/320 |
| 6,155,607 | A * | 12/2000 | Hewitt | F16L 37/0985 285/322 |
| 6,499,772 | B1 * | 12/2002 | Minemyer | F16L 37/138 285/322 |
| 6,872,043 | B2 * | 3/2005 | Yukawa | E02F 3/325 414/694 |
| 7,682,124 | B2 * | 3/2010 | Miyazaki | E02F 3/384 414/694 |
| 7,857,361 | B1 * | 12/2010 | Hanser | F16L 37/138 285/322 |
| 8,708,629 | B2 | 4/2014 | Smith | |
| 9,255,453 | B1 * | 2/2016 | Jennings | E21B 17/085 |
| 2003/0006610 | A1 * | 1/2003 | Werth | F16L 33/225 285/322 |
| 2005/0001427 | A1 * | 1/2005 | Liew | E21B 33/038 285/322 |
| 2006/0082152 | A1 * | 4/2006 | Neves | E21B 17/06 285/322 |
| 2007/0252387 | A1 * | 11/2007 | Beard | E21B 17/085 285/323 |
| 2009/0295152 | A1 * | 12/2009 | Guest | F16L 37/101 285/323 |
| 2013/0049361 | A1 | 2/2013 | Salehi-Bakhtiari | |
| 2013/0140813 | A1 * | 6/2013 | Pallini, Jr. | E21B 17/043 285/323 |
| 2014/0284915 | A1 | 9/2014 | Arnold et al. | |

\* cited by examiner

QUICK CONNECTOR FOR HYDRAULIC HOSE COUPLING

TECHNICAL FIELD

The present disclosure generally relates to hydraulic systems and, more particularly, relates to couplings for hydraulic hoses and tubes of hydraulics systems.

BACKGROUND

Hydraulics are used in numerous applications. For example, with earth moving, construction, and agricultural equipment, various implements and attachments are powered by hydraulic cylinders. Using a track-type tractor as an example, the blade, bucket or other implement on the front of the loader are attached to boom arms swingably attached to the chassis of the track-type tractor. Movement of the boom arms and implements are powered by hydraulic cylinders. The hydraulic cylinders are in turn in fluid communication with a hydraulic fluid pump powered by an engine mounted on the chassis. Accordingly, it can be seen that multiple couplings are needed when communicating the hydraulic fluid from the pump to the cylinders.

While effective, and used for decades, the couplings between the various tubes and hoses of the hydraulic system are particularly prone to leakage. Such leakage necessarily detrimentally affects the efficiency of the machine, adds cost to operation of the machine, and disturbs the environment.

In light of the foregoing, it has been known to provide robust couplings between the hydraulic conduits of such hydraulic systems. Such robust couplings typically include a plurality of threaded bolts connecting fittings attached to the adjacent hydraulic hoses. The inclusion of multiple bolts, typically four, thus makes it a fairly time consuming process to connect and disconnect conduits. In addition, current couplings are rotationally sensitive in that the mating halves of the coupling must be symmetrically aligned before the bolts can be attached. This also adds to the time involved with changing conduits. Moreover, leakage from such robust connectors continues to be problematic.

With respect to patented technology, U.S. Pat. No. 7,490,388 discloses a clamp for connecting a duct to a base surface which includes a hinged clamp assembly sized so as to circumscribe the ducts being joining. A threaded bolt removably connects the two halves of the clamp together. However, such a device does not provide any sealing capability whatsoever.

Accordingly, it can be seen that a need exists for a hydraulic fluid line coupling system with improved resistance to leakage, reduced reliance on rotational orientation of the coupling components, quick assembly and disassembly, and which is designed for reduced likelihood of accidental pressure discharge.

SUMMARY

In accordance with one aspect of the disclosure, hydraulic fluid line coupling system is disclosed which may comprise a female fitting, a male fitting, and a collar surrounding the female fitting, and the male fitting.

In accordance for another aspect of the disclosure, a method of sealing a hydraulic fluid line coupling system is disclosed which may comprise inserting a male fitting into a female fitting, sealing the male fitting to the female fitting using first and second elastomeric rings, and securing the male fitting to the female fitting using a collar.

In accordance with yet another aspect of the disclosure, machine is disclosed which may comprise a chassis, engine mounted on the chassis, a hydraulic fluid pump powered by the engine, a hydraulic cylinder in fluid the communication with the hydraulic fluid pump, a plurality of a hydraulic fluid tubes connecting the hydraulic fluid pump and the hydraulic cylinder, and a hydraulic fluid line coupling system connecting the plurality of the hydraulic fluid tubes together, each hydraulic fluid line coupling system including a male fitting, a female fitting, a first and second elastomeric seals between the male and female fittings, and a collar securing the female fitting, male fitting, and first and second elastomeric seals together.

These are other aspects and features of the present disclosure will be more readily understood when read in light of the following detailed description when taken in conjunction with the accompany drawings.

While the present disclosure is susceptible to various modifications and alternative construction, certain illustrative embodiments that are shown and described below in detail. However, it is to be understood that the present disclosure is not limited to the specific embodiments disclosed, but instead includes all modifications, alternatives, constructions, and equivalents thereof.

DETAILED DESCRIPTION

Figure 1:
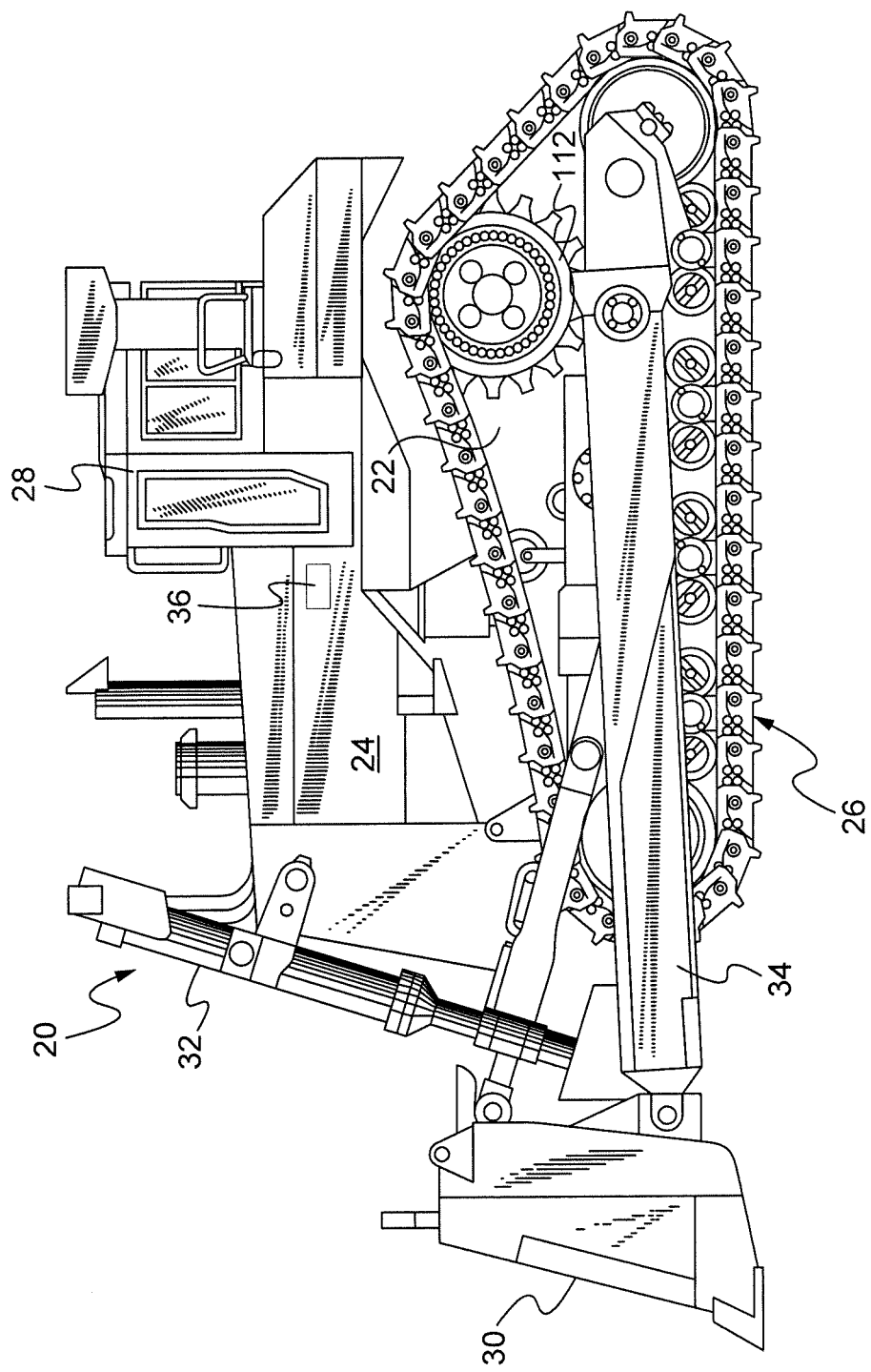
FIG. 1 is a perspective view of a machine constructed in accordance with the teachings of the present disclosure.

Referring now to drawings, and with specific reference to FIG. 1, a machine constructed in accordance to the teachings of the present disclosure is generally referred to by reference numeral 20. While the machine 20 is depicted as a track-type tractor, it is to be understood that the teachings of the present disclosure can be used with equal efficacy in connection with any other number of earth-moving machines including but not limited to loaders, motor graders, pipe layers, skid steers and the like. In addition, the teachings of the present disclosure can be used outside of earth-moving equipment including, but not limited to, other construction, agricultural, mining, marine, and on-highway machines.

With respect to the machine 20, it is shown to include a chassis 22 on which is mounted an engine 24. The machine 20 further includes first and second tracks 26 laterally flanking the machine, although in other embodiments, the form of locomotion may be provided in alternative formats such as, but not limited to, wheels. In addition, the chassis 22 supports an operator cabin 28.

As also illustrated in FIG. 1, the machine 20 may include one more implements 30 provided to perform useful work.

The implement 30 depicted in FIG. 1 is a blade, but other implements are certainly possible and well known. The implement 30 is movable relative to the machine 20 by way of one or more hydraulic cylinders 32 and boom arms 34. The hydraulic cylinders 32 are in fluid communication with a hydraulic fluid pump 36 by way of a plurality of hydraulic fluid conduits 38. The pump 36 in turn is powered by the engine 24.

Figure 2:
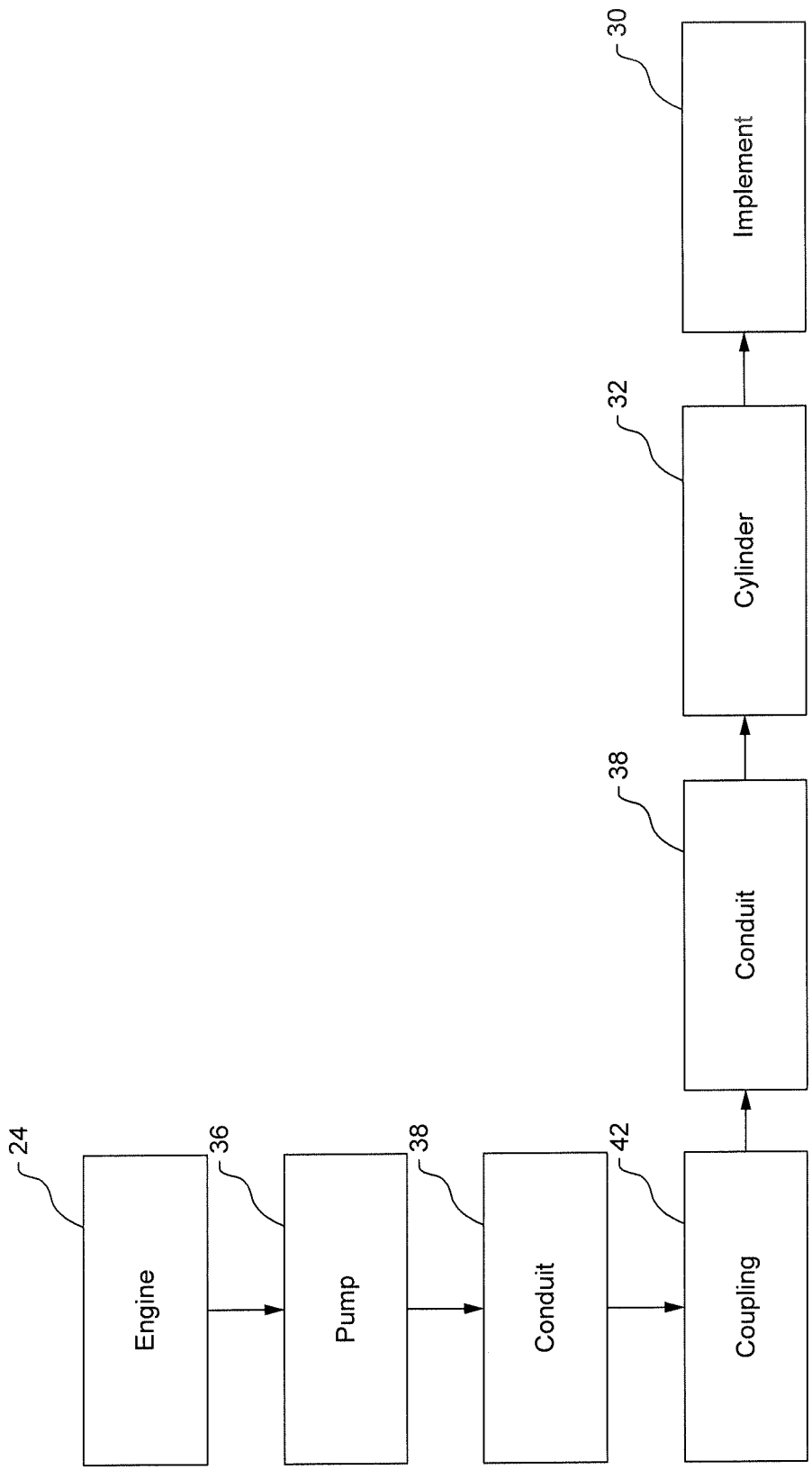
FIG. 2 is a schematic illustration of a hydraulic system constructed in accordance with the teachings of the present disclosure.

Turning now to FIG. 2, a schematic illustration of a hydraulic fluid system 40 constructed in accordance with the teachings of the present disclosure is provided. As shown therein, the hydraulic fluid system 40 includes the aforementioned pump 36 in fluid communication with the hydraulic cylinders 32 by way of conduits 38. In addition, FIG. 2 further illustrates that the plurality of hydraulic fluid conduits 38 are connected by way of hydraulic fluid line coupling systems 42 as will now be described in further detail.

Figure 4:
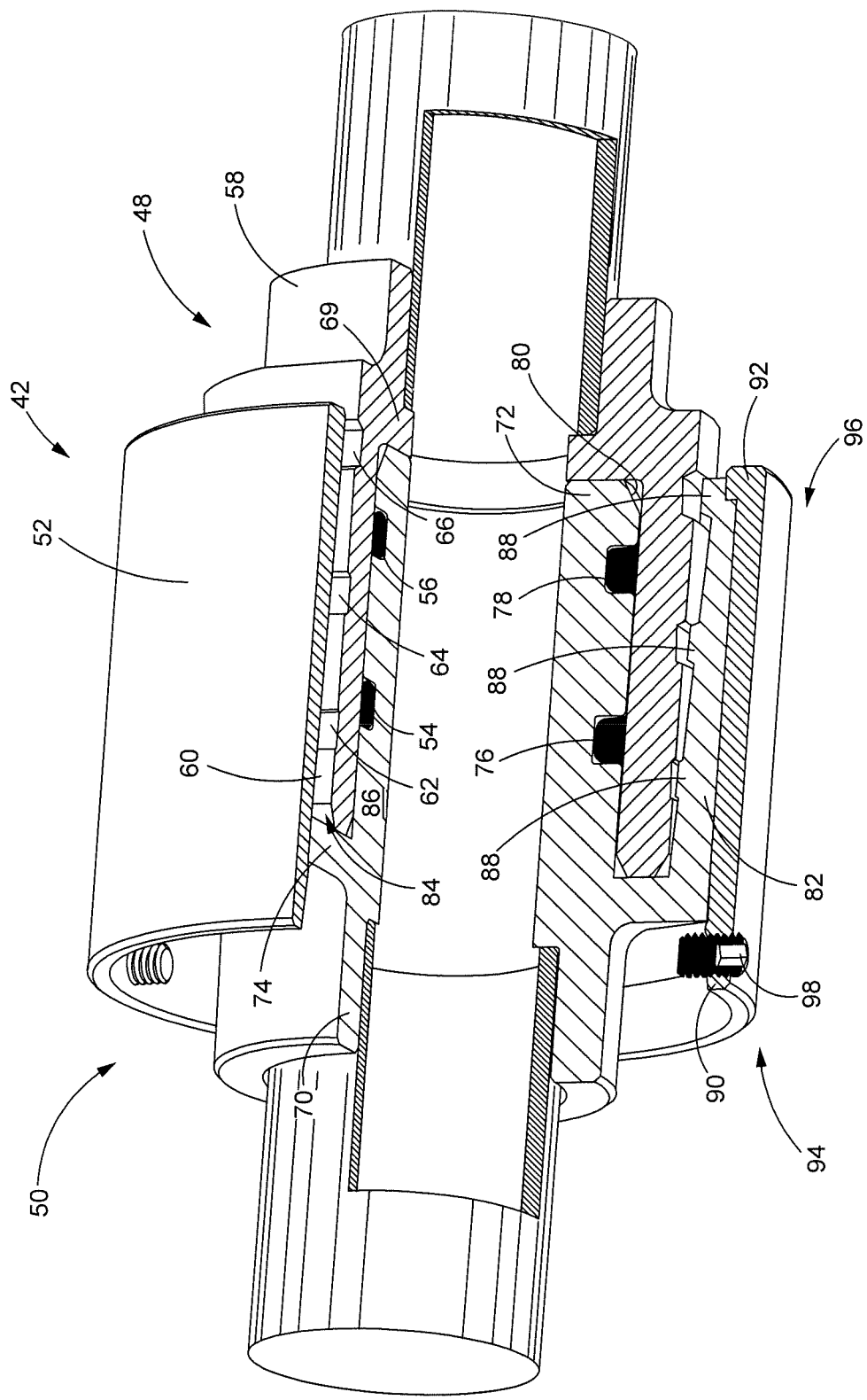
FIG. 4 is a cross-sectional view of the hydraulic fluid line coupling system of FIG. 3, with hydraulic fluid conduits attached.

The hydraulic fluid line coupling system 42 is shown, in FIG. 4 connecting a first hydraulic fluid tube or hose 44 to a second hydraulic fluid tube 46. While hydraulic fluid tube couplings have been known in the prior art, the present disclosure drastically improves on such attempts by having improved sealing capability, no reliance on rotational orientation of the tubes, quicker assembly and disassembly, lower costs to manufacture, and improved resistance to accidental pressure discharge.

Figure 3:
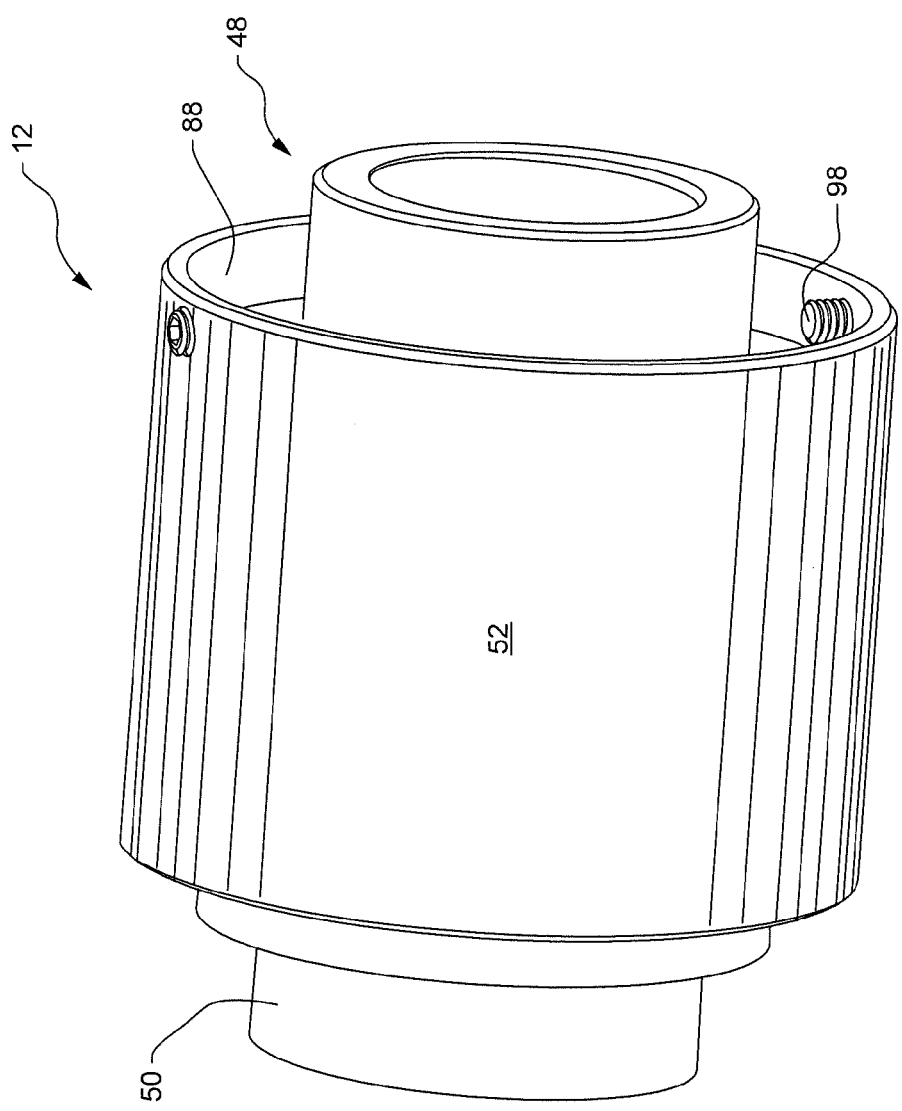
FIG. 3 is a perspective view of a hydraulic fluid line coupling system constructed in accordance with the teachings of the disclosure.
Figure 5:
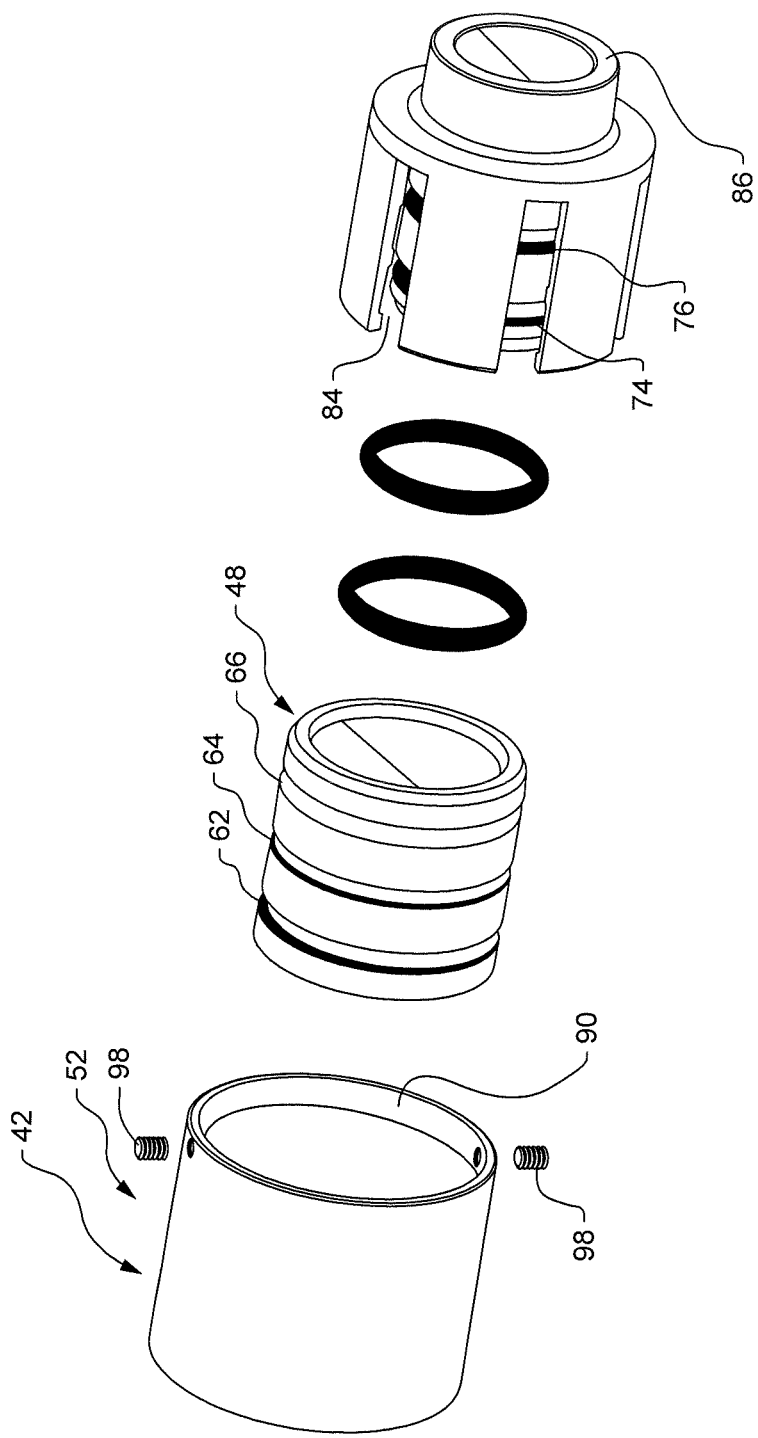
FIG. 5 is an exploded view of the hydraulic fluid line coupling system of FIG. 3.

As shown in FIGS. 3-5, the hydraulic fluid line coupling system 42 includes a male fitting 48, a female fitting 50, a collar 52, a first elastomeric seal 54 and a second elastomeric seal 56. With specific reference to FIG. 5, the male fitting 48 is shown in detail to be substantially cylindrical in shape including a hose or proximal end 58 and a sealing or distal end 60. Intermediate the proximal and distal ends 58 and 60 the male fitting 48 is shown to also include first, second and third external circumferential grooves 62, and 66. In addition, the distal end 60 is shown to include a tapered rim 68, the importance of which will be described in further detail herein. Finally, the proximal end 58 includes a radially inwardly directed shoulder 69. While the male fitting 48 is depicted and described as substantially cylindrical, it is to be understood that other geometric shapes are possible including, but not limited to, those which are in cross-section, triangular, square, hexagonal or other polygonal shapes.

With respect to the female fitting 50, it is also shown in detail in FIG. 5. The female fitting 50 is also substantially cylindrical in shape including a proximal or hose end 70 and a distal or sealing end 72. A radially outwardly directed rib 74 is provided between the distal or sealing end 72 and the proximal or hose end 70. The distal end 72 includes first and second circumferential or radial grooves 76, 78, as well as a circumferential taper or rim 80, the importance of which will be described herein. In addition, the female fitting 50 includes a plurality of flexible fingers 82 which cantilever away from the radially outwardly directed rib 74. In so doing, a receiving space 84 is defined between the fingers 82 and an inner core 86 of the female fitting 50. As well be noted best in FIGS. 4 and 5, a plurality of barbs 88 radially inwardly extend from the flexible fingers 82.

Turning to the collar 52, it is shown best in FIG. 5 to be substantially cylindrical in shape but for radially inwardly directed ribs 90, 92 provided at distal and proximal ends, 94, 96, respectfully. In addition, the inner diameter (ID) of the collar 52 is just larger than outer diameter (OD) of the flexible fingers 82 go as to allow slidable movement. The ribs 90, 92 are provided at a distance sufficient to enable flanking of the fingers 82 as well.

Finally, also depicted in FIG. 5 are the first elastomeric radial seal 54 and the second elastomeric radial 56. Whereas the male fitting 48, female fitting 50 and collar 52 are manufactured from rigid materials such as, but not limited to, steel and other metals, the elastomeric seals 54 and 56 are manufacture from flexible materials such as, but not limited to, rubber and polymeric o-rings, gaskets, and the like. While two elastomeric seals 54, 56 are shown in other embodiments it is to be understood that more than two seals, or less than two seals, could be used.

When assembled, the hydraulic fluid line coupling system 42 joins the first tube 44 and second tube 46, as shown best in FIG. 4, in a fluid tight arrangement with redundant seals for robustness against leaks, no reliance on rotational orientation of the various components for assembly, quick assembly, and greatly improved ability to prevent accidental pressure discharges. These features are perhaps best illustrated in the sectional view of FIG. 4. As will be noted therein, the redundant sealing feature is provided by way of the first elastomeric radial seal 54 and second elastomeric radial seal 56. As shown therein, the first elastomeric seal 54 is sized so as to be inserted within the first circumferential or radial groove 76 of the female fitting 50. When the male fitting 48 is received around the inner core 86 of the female male fitting 50, the first elastomeric seal 54 is compressed within the first radial groove 76 so as to prevent any fluid transmission there between. To improve longevity of the radial seal 54, a back-up ring (not shown) could be used. The back-up ring could be annular in shape and reside within the radial groove 76 to support the radial seal 54 so as to not extrude due to hydraulic pressure. In some embodiments, more than one back-up ring could be used which each radial seal so as to flank the radial seals and provide support from both sides.

In addition, the second radial seal 56 is received within the second radial groove 78 such that when the male fitting 48 is thoroughly received within the female fitting 50, the second elastomeric seal 56 is compressed against the female fitting 50 as well. So as to facilitate fluid tight engagement between the male and female fittings 48 and 50, it will be noted that the tapered rim 68 is provided so as to draw the male fitting the 48 fully against the rib 74 shoulder when the hydraulic fluid line coupling system 42 is assembled. Similarly, tapered rim 80 of the inner core 86 draws the female fitting 50 fully against the shoulder 69 of the male fitting 48.

While the first and second elastomeric seal 54 and 56 provide the redundant sealing capabilities guarding against leaks, the improved ability of the hydraulic fluid line coupling system 42 against accidental pressure discharge is provided in part by way of the collar 52, flexible fingers 82 and barbs 88. As shown best in FIG. 4, the collar 52 biases the flexible fingers 82 radially inwardly, which in term biases the barbs 88 into the first, second and third circumferential grooves 62, 64 and 66 of the male fitting 48. In so doing, the hydraulic fluid line coupling system 42 cannot be accidentally disconnected and thus accidental pressure discharges are avoided. This ability is further enhanced by having the collar ribs 90, 92 flank the flexible fingers 82 and thereby axially lock the collar 52 in place. Moreover, a set screw 98 can be threaded or otherwise removable attended to the collar 52 proximate the rib 90 to further prevent inadvertent removal of the collar, thereby enhancing the accidental pressure discharge protection of the present disclosure.

Not only does the hydraulic fluid line coupling system 42 of the present disclosure provide for improved sealing and accidental pressure discharge prevention, but as will be noted, all of the components described above are not reliant on any particular rotational orientation so as to be effective. This is in marked contrast to prior art couplings which required the connecting components of the coupling to be rotated in a particular orientation before being connected. In so doing, the speed with which the coupling 42 can be assembled and disassembled is greatly improved.

Figure 6:
FIG. 6 is a flow chart depicting a sample sequence of steps which may be practiced in accordance with the teachings of the present disclosure.

Referring now to FIG. 6, a flow chart depicting the sample sequence of steps which may be practiced in conjunction with the teachings of the present disclosure is provided. Stated differently, the present disclosure does not only set forth structure enabling improved sealing capability and hydraulic fluid line coupling system, but also a method of improved sealing and hydraulic fluid line coupling system as well.

Starting with a step 100, the method includes attaching the male fitting 48 to the first tube 44. This may be done as by crimping, welding, brazing or the like. Similarly, in a second step 102, the female fitting 50 is attached to the second tube 46. Once the male and female fittings 48 and 50 are attached to the tubes 44 and 46, the first and second elastomeric seals 54 and 56 are mounted to the female fitting 50 as indicated in steps 104 and 106. In a next step 108, the male fitting 48 is then inserted into the female fitting 50 with the first and second elastomeric seals 54 and 56 being compressed there between. In order to secure the tubes 44 and 46 together, the collar 52 is then secured around the flexible fingers 82 of the female fitting in a step 110. This in turn forces the barbs 88 into the grooves 62-66 of the male fitting 48 as indicated in step 112.

While the foregoing sets forth a method for connecting the first and the second tubes 44 and 46, it is to be understood that the method of the present disclosure also includes a method for quickly disassembling the hydraulic fluid line coupling system 42 as well. More specifically, in a step 114, the collar 52 can be axially slid away from the female fitting 50. This in turn frees the barbs 88 from the male fitting 48 such that in a step 116, the hydraulic fluid line coupling system 42 can then be disassembled simply by conducting the steps 108 through 108 in reverse order.

INDUSTRIAL APPLICABILITY

In operation, the present disclosure can find industrial applicability, in a number of different settings. For example, in the construction of earth moving machines, multiple hydraulic fluid tubes are routed in and around the machine. As each of those tubes needs to be interconnected, the present disclosure sets forth a coupling for doing so in a reliable sealed manner without any reliance upon the rotational orientation of the components. In addition, it does so quickly, at a minimal of cost, and with greatly improved ability to prevent accidental pressure discharge.

With respect to improved sealing capability, such is set forth by providing redundant seals in the form of first and second elastomeric seals between the male and female fitting of the coupling. In so doing, if one seal were to degrade or even fail, the second seal will be able to continue to provide leakage prevention.

With respect to avoiding rotational orientation reliance, it can be seen that each of the components of the coupling are provided in symmetric fashion such that regardless of the rotational orientation of the components the coupling can be assembled and disassembled with ease.

With respect to speed of assembly and disassembly, as opposed to prior art devices which both require a specific rotation orientation to be operable, and multiple fasteners for providing the seal, the present disclosure provides a single collar which simply needs to be removed for the coupling to be disassembled.

Finally, with regard to prevention of accidental pressure discharge, as the assembly is connected by way of a plurality of ribs, barbs, shoulders and set screws which frictionally engage the male and female fittings, such that the likelihood of the coupling coming apart and causing accidental pressure discharge is greatly reduced.

What is claimed is:

1. A hydraulic fluid line coupling system, comprising:
    a female fitting comprising an inner core, a radially outwardly directed rib, a plurality of flexible fingers integrally connected to and cantilevered away from the radially outwardly directed rib, and a receiving space radially positioned between the inner core and the plurality of flexible fingers integrally connected to and cantilevered away from the radially outwardly directed rib, the receiving space longitudinally positioned between a cylindrical distal end and the radially outwardly directed rib;
    a male fitting received in the receiving space of the female fitting; and
    a collar surrounding the female fitting and the male fitting, wherein the female fitting further includes a radially outwardly directed shoulder, wherein a the distal end of the male fitting engages the radially outwardly directed shoulder rib of the female fitting.

2. The hydraulic fluid line coupling system of claim 1, wherein the a first elastomeric seal and a second elastomeric seal circumscribe the inner core of the female fitting.

3. The hydraulic fluid line coupling system of claim 1, wherein the female fitting includes a cylindrical proximal end and a cylindrical distal end, and wherein the plurality of flexible fingers from the cylindrical extending from the proximal end the radially outwardly directed rib toward the cylindrical distal end.

4. The hydraulic fluid line coupling system of claim 1, wherein the cylindrical distal end includes first circumferential radial groove receiving a first elastomeric seal and a second circumferential radial groove receiving a first and second elastomeric seal.

5. The hydraulic fluid line coupling system of claim 1, wherein the male fitting includes a plurality of circumferential external grooves and the fingers include a plurality of radially inwardly directed barbs, the barbs being received in the plurality of circumferential external grooves in the male fitting.

6. The hydraulic fluid line coupling system of claim 1, wherein the cylindrical collar includes a pair of radially inwardly directed detents ribs at first and second ends of the cylindrical collar, the detents ribs being spaced to longitudinally flank the plurality of fingers on the female fitting.

7. The hydraulic fluid line coupling system of claim 1, wherein the male fitting includes a radially inwardly directed shoulder, the distal end of the female fitting engaging the radially inwardly directed shoulder of the male fitting.

8. A method of sealing a hydraulic fluid line coupling system, comprising:
    inserting a nonthreaded male fitting into a receiving space of a nonthreaded female fitting, the nonthreaded female fitting comprising an inner core, a radially outwardly directed rib, a plurality of flexible fingers integrally connected to and cantilevered away from the radially outwardly directed rib, the receiving space radially positioned between the inner core and the plurality of flexible fingers integrally connected to and cantilevered away from the radially outwardly directed rib, the receiving space longitudinally positioned between a cylindrical distal end and the radially outwardly directed rib;

sealing the nonthreaded male fitting to the nonthreaded female fitting using first and second elastomeric rings;

securing the nonthreaded male fitting to the nonthreaded female fitting using a collar;

extending a plurality of fingers from the female fitting to define a receiving space between the fingers and a center core of the nonthreaded female fitting, and wherein inserting the nonthreaded male fitting involves sliding the nonthreaded male fitting into the receiving space; and providing a plurality of radially inwardly directed barbs on the plurality of fingers, and providing a plurality of circumferential extended grooves in the nonthreaded male fitting, and the method further includes positioning the plurality of barbs in the plurality of circumferential external grooves of the nonthreaded male fitting.

9. The method of claim 8, further including circumscribing the nonthreaded female fitting with the first and second elastomeric rings.

10. The method of claim 8, further including providing a pair of radially inwardly directed detents ribs in the collar and the securing step involves sliding the collar over the nonthreaded female fitting until the detents ribs longitudinally flank the plurality of fingers on the nonthreaded female fitting.

11. The method of claim 8, further including providing a radially inwardly directed shoulder on the nonthreaded male fitting, and wherein the inserting step involves sliding the nonthreaded male fitting into the nonthreaded female fitting until a distal end of the nonthreaded female fitting engages the radially inwardly directed shoulder of the nonthreaded male fittings.

12. The method of claim 8, further including providing a radially outwardly directed shoulder on the male fitting, and wherein the inserting step involves sliding the nonthreaded male fitting until a distal end of the nonthreaded male fitting engages the radially outwardly directed shoulder rib of the nonthreaded female fitting.

13. A machine, comprising:
a chassis;
an engine mounted on the chassis;
a hydraulic fluid pump powered by the engine;
a hydraulic cylinder in fluid communication with the hydraulic fluid pump; and
a first hydraulic fluid tube and a second hydraulic fluid tube connecting the hydraulic fluid pump and the hydraulic cylinder; and
a hydraulic fluid line coupling system connecting the first hydraulic fluid tube and the second hydraulic fluid tube together, each hydraulic fluid line coupling system including a nonthreaded male fitting having a hose end comprising a recess configured to circumferentially engage an outer circumference of the first hydraulic fluid line, the male fitting received in a receiving space of a nonthreaded female fitting, the nonthreaded female fitting having a proximal end comprising a recess configured to circumferentially engage an outer circumference of the second hydraulic fluid tube, the nonthreaded female fitting further comprising an inner core, a radially outwardly directed rib, a plurality of flexible fingers integrally connected to and cantilevered away from the radially outwardly directed rib, the receiving space radially positioned between the inner core and the plurality of flexible fingers integrally connected to and cantilevered away from the radially outwardly directed rib, the receiving space longitudinally positioned between a cylindrical distal end and the radially outwardly directed end, a first elastomeric seal and a second elastomeric seal between the nonthreaded female fitting and the nonthreaded male fitting, and a collar surrounding the nonthreaded female fitting, the nonthreaded male fitting, the first elastomeric seal and the second elastomeric seal.

14. The machine of claim 13, wherein the inner core further includes first and second circumferential grooves receiving the first elastomeric seal and the second elastomeric seal.

15. The machine of claim 14, wherein the plurality of finger includes a plurality of inwardly directed barbs, and the nonthreaded male fitting includes a plurality of circumferential external grooves, the plurality of inwardly directed barbs being received in the plurality of circumferential external grooves in the nonthreaded male fitting.

* * * * *